(12) United States Patent
Saran et al.

(10) Patent No.: US 6,451,276 B1
(45) Date of Patent: Sep. 17, 2002

(54) RECOVERY OF ELEMENTAL PHOSPHORUS FROM PHOSPHORUS SLUDGE

(75) Inventors: Mohan S. Saran, Grand Island, NY (US); James R. Brooks, Thompson Station, TN (US); David C. Potts, Franklin, TN (US)

(73) Assignee: Glenn Springs Holdings, Inc., Lexington, KY (US)

( * ) Notice: Subject to any disclaimer, the term of this patent is extended or adjusted under 35 U.S.C. 154(b) by 118 days.

(21) Appl. No.: 09/371,284

(22) Filed: Aug. 10, 1999

(51) Int. Cl.$^7$ ............................................... C01B 25/01
(52) U.S. Cl. ................. 423/322; 423/157.2; 423/157.3; 423/158; 210/710; 210/737; 210/906
(58) Field of Search ............................. 423/322, 157.2, 423/157.3, 158; 210/710, 737, 906

(56) References Cited

U.S. PATENT DOCUMENTS

| | | | | |
|---|---|---|---|---|
| 3,436,184 A | * | 4/1969 | Hinkebein | 423/322 |
| 3,442,621 A | | 5/1969 | Hinkebein | 423/322 |
| 3,515,515 A | | 6/1970 | Hinkebein | 423/322 |
| 4,686,094 A | * | 8/1987 | Roberts | 423/322 |
| 4,717,558 A | * | 1/1988 | Beck | 423/322 |

* cited by examiner

Primary Examiner—Tom Dunn
Assistant Examiner—Maribel Medina

(57) ABSTRACT

Disclosed is a method of recovering elemental phosphorus from a sludge that contains water, dirt, and elemental phosphorus. In the first step, the sludge is melted. A mixture is formed of the melted sludge and about 0.5 to about 5 wt % of an oxidizing agent, based on the weight of elemental phosphorus in the sludge, and about 75 to about 580 wt % water, based on the weight of the sludge. The mixture is stirred until a continuous elemental phosphorus phase forms. The purified phosphorus phase is separated from the mixture.

19 Claims, No Drawings

RECOVERY OF ELEMENTAL PHOSPHORUS FROM PHOSPHORUS SLUDGE

BACKGROUND OF THE INVENTION

This invention relates to a method of recovering elemental phosphorus from phosphorus sludge. In particular, it relates to such a method where the sludge is melted, an oxidizing agent and water are added, and the sludge is stirred to coalesce phosphorus globules into a pure phosphorus continuous phase which separates from the dirt in the sludge.

Elemental phosphorus can be made by heating phosphate rock, carbon, and sand in an electric furnace. Phosphorus vapors given off in the furnace contain solid impurities, such as slag, phosphate rock, sand, and coke, which cause the formation of sludge when the phosphorus vapors are condensed to the liquid form. Gradually, phosphorus sludge accumulates on top of this liquid phosphorus layer.

Phosphorus sludge is often stored in outdoor ponds. Periodically, it is necessary to reduce the amount of stored sludge either by recovering phosphorus or by converting the sludge into useful products. Such treatment may require the separation of phosphorus from the impurities.

In U.S. Pat. Nos. 3,436,184 and 3,515,515 there is described a process for reducing the phosphorus content of phosphorus sludge by adding chromic acid to the sludge. That process removes only a portion of the phosphorus in the sludge.

SUMMARY OF THE INVENTION

We have discovered that when an aqueous solution of an oxidizing agent is added to a heated phosphorus sludge followed by stirring, a continuous phosphorus phase forms which separates from the dirt in the sludge. Thus, unlike the prior process, in the process of this invention close to the entire amount of elemental phosphorus in the sludge can be recovered.

DESCRIPTION OF THE PREFERRED EMBODIMENTS

The process of this invention is applicable to any phosphorus sludge that contains about 0.5 to about 90 wt % elemental phosphorus (usually present as $P_4$), about 2 to about 80 wt % water, and about 2 to about 60 wt % "dirt," which is typically a mixture of various solids such as carbon fines, slag (calcium-aluminum silicates), sand, and phosphate rock. The process of this invention is particularly applicable to phosphorus sludges that contain about 5 to about 80 wt % elemental phosphorus.

Phosphorus sludge has been described in the literature as being a phosphorus-in-water emulsion. While we do not wish to be bound by any theories, we believe that the phosphorus in a phosphorus sludge is a discontinuous phase consisting of phosphorus globules. The globules may also contain water and fine dirt. They do not coalesce because their surfaces may be partially oxidized and may carry electrical charges as well as dirt and water. In our invention, when an oxidizing agent is added followed by vigorous stirring, the oxidizer cleans the surfaces of the phosphorus globules, allowing them to coalesce. During purification the phosphorus separates from dirt and water. The process must be performed as a batch process because over-stirring causes the cleaned phosphorus to form an emulsion of fine phosphorus particles suspended in an aqueous solution. It is difficult to separate the phosphorus from this emulsion.

In the first step of the process of this invention, the phosphorus sludge is melted. As the phosphorus melts the sludge becomes more fluid. A temperature of about 55 to about 75° C. is usually satisfactory as lower temperatures may not melt the sludge and higher temperatures are unnecessary.

In the second step of the process of this invention, an oxidizing agent is added to the melted sludge. Examples of oxidizing agents that can be used include chromic acid, hydrogen peroxide, nitric acid, ozone, and oxygen. The preferred oxidizing agent is chromic acid as it has a fast, controllable reaction rate. Chromic acid is preferably added as a solution of $CrO_3$ in water as it is easier to handle as a solution. A 1 to 4 wt % chromic acid solution is preferred. The amount of oxidizing agent used should be about 0.5 to about 5 wt % of the amount of solution and the amount of solution used should be about 1 to about 5.8 times the amount of sludge. Less oxidizing agent may not be effective and more is unnecessary.

It is also necessary to add water to the sludge to help float the dirt away from the elemental phosphorus. The water can be added separately or it can be added with the oxidizing agent. The amount of water added should be about 75 to about 580 wt %, based on the weight of the sludge, as the removal of dirt from the sludge is facilitated by water, but too much water is unnecessary and provides no additional benefit. The preferred amount of water added is about 90 to about 150 wt %.

In the third step of the process of this invention, the melted sludge and oxidizing agent solution are stirred. This is a critical step as stirring is necessary to clean the phosphorus, remove the dirt, and form a continuous elemental phosphorus phase. That is, the sludge is stirred enough to liberate the dirt, producing clean elemental phosphorus, but not so much that a phosphorus-in-water emulsion forms. Stirring to produce that result typically requires about 15 minutes to about 30 minutes at about 150 to about 300 rpm. Once a continuous phosphorus phase forms, the stirring should be stopped as additional stirring may break the elemental phosphorus into droplets and form a phosphorus-in-water emulsion, preventing the recovery of pure elemental phosphorus.

After the stirring is finished, the reaction mass is allowed to settle for at least 30 minutes to allow the phosphorus to settle as a separate phase. The heavy dirt (e.g., pebbles, slag, etc.) settles to the bottom of the reactor. The next layer is the elemental phosphorus, which has a density of about 1.8 g/cc. On top of the elemental phosphorus is the finer dirt, suspended in water. The various components of the sludge can then be separated. The resulting elemental phosphorus is typically about 90 to about 99 wt % pure and, if it is centrifuged or filtered, its purity can rise to 99.9 wt %. Instead of settling, the entire reaction mass can be filtered or centrifuged to recover the phosphorus, but settling is preferred because it makes it easier to handle the phosphorus phase only.

The following examples further illustrated this invention. Analytical data was obtained by separating the phosphorus as a frozen layer from the rest of the reaction mass.

EXAMPLES 1 to 6

A weighed sample of $P_4$ sludge (molten or solid) containing 49.4 wt % phosphorus, 23.3 wt % dirt, and 27.3 wt % water (average of 4 determinations) was added to 500 g of a chromic acid solution of various concentrations in a 2-liter resin flask equipped with a stainless steel stirrer (2 inches long curved paddle) having a variable speed capability. The flask was placed in a large Pyrex water bath which was heated with an immersion heater to 65 to 75° C. and stirred at 100 rpm for 15 minutes with a magnetic stirrer. The sludge, when solid, was allowed to melt before stirring began. After the stirring was stopped, the reaction contents were allowed to settle for ½ hour. Phosphorus settled at the bottom as a separate layer, heavier dirt settled under the phosphorus layer, lighter dirt on top of the phosphorus layer, and fine dirt stayed suspended in the aqueous layer.

The settled phosphorus layer was allowed to freeze and removed from the aqueous dirt suspension or it was removed as a molten layer and filtered or centrifuged. The following table gives the conditions used and the results:

| Example | Sludge (g) | $CrO_3$ (wt %) | Phosphorus Phase Amount (g) | Phosphorus Phase Dirt (wt) % |
|---|---|---|---|---|
| 1 | 97.8 | 0 | 101 | 20.9 |
| 2 | 85.5 | 1 | 63 | 17.8 |
| 3 | 104.2 | 2 | 81 | 12.8 |
| 4 | 94.3 | 3 | 58 | 7.8 |
| 5 | 99.0 | 4 | 61 | 6.7 |
| 6 | 106.2 | 5 | 66 | 6.4 |

The above examples show that chromic acid concentrations of about 3 to 4 wt % are optimal and that using higher concentrations of chromic acid does not offer any advantage.

EXAMPLES 7 and 8

Example 4 was repeated at different stirring rates. The following table gives the results:

| Example | Sludge (g) | Stirring Rate (rpm) | Phosphorus Phase Amount (wt) | Phosphorus Phase Dirt (wt %) |
|---|---|---|---|---|
| 4 | 94.3 | 100 | 58 | 7.8 |
| 7 | 100.1 | 280 | 64 | 1.2 |
| 8 | 101 | 472 | 45 | 1.1 |

The above examples show that a better separation of the dirt from the phosphorus product was obtained at the higher stirring rates.

EXAMPLES 9 to 14

Examples 4, 7, and 8 were repeated using different stirring times. The following table gives the results:

| Example | Sludge (g) | Stirring Rate (rpm) | Stirring Time (min) | Phosphorus Phase Amount (g) | Phosphorus Phase Dirt (wt %) |
|---|---|---|---|---|---|
| 4 | 94.3 | 100 | 15 | 58 | 7.8 |
| 9 | 102 | 100 | 60 | 62 | 1.3 |
| 10 | 97.7 | 100 | 120 | 50 | 0.7 |
| 11 | 102 | 280 | 5 | 59 | 2.2 |
| 7 | 100.1 | 280 | 15 | 64 | 1.2 |
| 12 | 103.6 | 280 | 30 | 78 | 0.3 |
| 13 | 105.7 | 280 | 55 | | * |
| 8 | 101 | 472 | 15 | 45 | 1.1 |
| 14 | 107.7 | 472 | 30 | | * |

*Fluffy homogeneous emulsion. No $P_4$ layer separated even after 10 months.

These examples show that a better separation of the dirt from the phosphorus product was obtained as the stirring time was increased, until a critical stirring time when the phosphorus did not separate.

EXAMPLES 15 to 23

Examples 4 and 7 were repeated using different amounts and concentrations of the chromic acid solution. The following table gives the results:

| Example | Sludge (g) | Chromic Acid Solution (g) | $CrO_3$ (wt %) | $CrO_3$ (g) | Stirring Rate (rpm) | Phosphorus Phase Amount (g) | Phosphorus Phase Dirt (%) |
|---|---|---|---|---|---|---|---|
| 4 | 94.3 | 500 | 3 | 15 | 100 | 58 | 7.8 |
| 15 | 103.4 | 500 | 3 | 15 | 200 | 60 | 0.5 |
| 16 | 100.3 | 500 | 0.5 | 2.5 | 280 | 63 | 18.2 |
| 17 | 99.8 | 500 | 1.0 | 5 | 280 | 56 | 8.3 |
| 18 | 100.5 | 500 | 1.5 | 7.5 | 280 | 59 | 0.8 |
| 19 | 92.5 | 500 | 2.0 | 10 | 280 | 47 | 0.3 |
| 20 | 102.8 | 500 | 2.5 | 12.5 | 280 | 51 | 0.7 |
| 7 | 100.1 | 500 | 3.0 | 15 | 280 | 64 | 1.2 |
| 8 | 101 | 500 | 3.0 | 15 | 472 | 45 | 1.1 |
| 21 | 100.8 | 150 | 3.0 | 4.5 | 280 | 63 | 4.4 |
| 17 | 99.8 | 500 | 1.0 | 5.0 | 280 | 56 | 8.3 |
| 22 | 100.3 | 250 | 2.0 | 5.0 | 280 | 54 | 6.7 |
| 23 | 100.3 | 200 | 2.5 | 5.0 | 280 | 58 | 4.2 |

The above examples show that a higher stirring rate results in less dirt in the phosphorus product and that at these higher stirring rates a chromic acid concentration of 1.5 to 3.0 wt % is more effective than a 3 to 4 wt % concentration of chromic acid at lower stirring rates.

EXAMPLES 24 to 26

The same procedure was used as in the previous examples on various different sludges using 150 g of different chromic acid solutions. A stirring rate of 280 rpm was used in these examples. The following table gives the results:

| Example | Sludge grams | Sludge % P | Sludge % Dirt | Sludge % $CrO_3$ | Treated $P_4$ Phase grams | Treated $P_4$ Phase % P | Treated $P_4$ Phase % Dirt |
|---|---|---|---|---|---|---|---|
| 24 | 100 | 6.5 | 60.8 | 3 | 6.2 | 99.8 | 0.02 |
| 25 | 100.3 | 6.5 | 60.8 | 2 | 6.9 | 99.8 | 0.16 |
| 26 | 100 | 6.5 | 60.8 | 0.5 | 4.4 | 94.7 | 5.3 |

The above experiments show that sludges having very different phosphorus and dirt compositions can be successfully treated with this process.

We claim:

1. A method of recovering elemental phosphorus from a sludge that contains water, dirt, and elemental phosphorus as a discontinuous phase comprising, in a batch process,
   (A) melting said sludge;
   (B) forming a mixture of said sludge and about 75 to about 580 wt % water, based on the weight of said sludge, and about 0.5 to about 5 wt % of an oxidizing agent, based on the weight of said water;
   (C) stirring said mixture until a continuous elemental phosphorus phase forms then stopping said stirring before a phosphorus-in-water emulsion forms; and
   (D) separating said continuous elemental phosphorus phase from said mixture.

2. A method according to claim 1 wherein said oxidizing agent is selected from the group consisting of chromic acid, hydrogen peroxide, nitric acid, ozone, and oxygen.

3. A method according to claim 1 wherein said oxidizing agent is chromic acid.

4. A method according to claim 1 wherein said separated continuous elemental phosphorus phase is filtered or centrifuged after step (D).

5. A method according to claim 1 wherein said continuous elemental phosphorus phase is separated by settling.

6. A method according to claim 1 wherein said sludge contains about 5 to about 80 wt % elemental phosphorus.

7. A method according to claim 1 wherein said dirt is a mixture of carbon fines, slag, sand, and phosphate rock.

8. A method according to claim 1 wherein said sludge is produced when phosphate rock, carbon, and sand are heated in an electric furnace.

9. A method according to claim 1 wherein said stirring in step (C) is for about 15 minutes to about 30 minutes at a rate of about 150 to about 300 rpm.

10. A method of recovering elemental phosphorus from a sludge that contains water, dirt, and about 5 to about 80 wt % elemental phosphorus as a discontinuous phase, comprising, in a batch process, (A) melting said sludge at a temperature of about 55 to about 75° C.;

(B) forming a mixture of said sludge and, in an amount about 1 to about 5.8 times the amount of sludge, an aqueous solution containing about 0.5 to about 5 wt % chromic acid;

(C) stirring said mixture until said elemental phosphorus forms a continuous phase then stopping said stirring before a phosphorus-in-water emulsion forms; and (D) separating said elemental phosphorus continuous phase from said mixture.

11. A method according to claim 10 wherein said separated elemental phosphorus continuous phase is filtered or centrifuged after step (D).

12. A method according to claim 10 wherein said elemental phosphorus continuous phase is separated by settling.

13. A method according to claim 10 wherein said dirt is a mixture of carbon fines, slag, sand, and phosphate rock.

14. A method according to claim 10 wherein said sludge is produced when phosphate rock, carbon, and sand are heated in an electric furnace.

15. A method according to claim 10 wherein said stirring in step (C) is for about 15 minutes to about 30 minutes at a rate of about 150 to about 300 rpm.

16. A method of recovering elemental phosphorus from a phosphorus sludge comprising, in a batch process, (A) melting a phosphorus sludge that contains about 5 to about 80 wt % elemental phosphorus in a discontinuous phase in a reactor at a temperature of about 55 to about 75° C.;

(B) forming a mixture of said sludge and, in an amount about 1 to about 5.8 times the amount of sludge, an aqueous solution containing about 0.5 to about 5 wt % chromic acid;

(C) stirring said mixture for about 15 minutes to about 30 minutes at about 150 to about 300 rpm whereby said elemental phosphorus forms a continuous phase but does not form a phosphorus-inter emulsion;

(D) permitting said mixture to settle;

(E) separating said elemental phosphorus continuous phase from said mixture; and (F) filtering or centrifuging said separated elemental phosphorus continuous phase.

17. A method according to claim 16 wherein said dirt is a mixture of carbon fines, slag, sand, and phosphate rock.

18. A method according to claim 16 wherein said sludge is produced when phosphate rock, carbon, and sand are heated in an electric furnace.

19. A method according to claim 15 wherein said separated elemental phosphorus continuous phase is filtered.

* * * * *